(12) United States Patent
Dobner et al.

(10) Patent No.: US 10,133,089 B2
(45) Date of Patent: Nov. 20, 2018

(54) CAST MOLDING TORIC CONTACT LENSES

(71) Applicant: Bausch & Lomb Incorporated, Rochester, NY (US)

(72) Inventors: Michael Henry Dobner, Honeoye Falls, NY (US); Craig A. Barrile-Josephson, Wadsworth, IL (US)

(73) Assignee: Bausch & Lomb Incorporated, Rochester, NY (US)

( * ) Notice: Subject to any disclaimer, the term of this patent is extended or adjusted under 35 U.S.C. 154(b) by 111 days.

(21) Appl. No.: 15/139,513

(22) Filed: Apr. 27, 2016

(65) Prior Publication Data

US 2016/0334641 A1 Nov. 17, 2016

Related U.S. Application Data

(60) Provisional application No. 62/160,846, filed on May 13, 2015.

(51) Int. Cl.
*B29D 11/00* (2006.01)
*G02C 7/04* (2006.01)

(52) U.S. Cl.
CPC ........ *G02C 7/048* (2013.01); *B29D 11/00038* (2013.01); *B29D 11/00509* (2013.01); *G02C 7/044* (2013.01)

(58) Field of Classification Search
CPC B29D 11/005; B29D 11/00509; G02C 7/044; G02C 7/048
See application file for complete search history.

(56) References Cited

U.S. PATENT DOCUMENTS

| 4,095,772 | A | | 6/1978 | Weber |
| 5,110,278 | A | | 5/1992 | Tait et al. |
| 5,211,969 | A | | 5/1993 | Yoshimura |
| 5,252,056 | A | | 10/1993 | Hoerner et al. |
| 5,254,000 | A | | 10/1993 | Friske et al. |
| 5,611,970 | A | | 3/1997 | Apollonio et al. |
| 5,620,720 | A | * | 4/1997 | Glick ........................ A61F 2/16 249/117 |
| 6,113,236 | A | | 9/2000 | Chapman et al. |
| 6,491,393 | B1 | | 12/2002 | Appleton |
| 6,997,428 | B1 | | 2/2006 | Andino et al. |
| 2005/0100631 | A1 | * | 5/2005 | Baba ................ B29D 11/00057 425/406 |
| 2010/0258962 | A1 | | 10/2010 | Doerr et al. |
| 2011/0266703 | A1 | * | 11/2011 | O'Neill ............ B29D 11/00509 264/1.32 |

FOREIGN PATENT DOCUMENTS

GB 2235407 A 3/1991

OTHER PUBLICATIONS

International Preliminary Report on Patentability for PCT/US2016/029419 dated Apr. 26, 2017.
International Search Report of the International Searching Authority for PCT/US2016/029419 dated Aug. 9, 2016 (6 pages).

* cited by examiner

Primary Examiner — Lisa L Herring

(57) ABSTRACT

A system and a method of cast molding toric contact lenses permits aligning first and second mold sections at multiple rotational positions. Each mold section includes a set of alignment features that engage with complementary alignment features on the other mold section.

18 Claims, 2 Drawing Sheets

CAST MOLDING TORIC CONTACT LENSES

BACKGROUND OF THE INVENTION

This relates to systems and methods of cast molding toric contact lenses.

Contact lenses having a toric optical zone (commonly referred to as "toric contact lenses") are used to correct refractive abnormalities of the eye associated with astigmatism. The toric optical zone provides a cylindrical optical correction to compensate for the astigmatism. Since astigmatism requiring vision correction is usually associated with other refractive abnormalities, such as myopia (nearsightedness) or hypermetropia (farsightedness), toric contact lenses are generally prescribed also with a spherical correction to correct myopic astigmatism or hypermetropic astigmatism. The toric surface may be formed in either the posterior lens surface (back surface toric lens) or in the anterior lens surface (front surface toric lens).

Whereas spherical contact lenses may freely rotate on the eye, toric contact lenses have a stabilization feature to inhibit rotation of the lens on the eye so that the cylindrical axis of the toric zone remains generally aligned with the axis of the astigmatism when the lens is worn. For example, a section of the lens may be thicker or thinner than another section to provide the stabilization. Toric contact lenses are manufactured with a selected relationship (or offset) between the cylindrical axis of the toric optical zone and the axis of the stabilization feature. This relationship may be expressed as the number of degrees (rotational angle) that the cylindrical axis is offset from the stabilization feature.

Accordingly, toric contact lenses, similar to spherical contact lenses, may be offered with a range of different spherical powers. Toric contact lenses, however, are also offered with a range of cylindrical optical corrections, and with a range of cylindrical axis orientations in order to accommodate patients with different astigmatic conditions. For example, a typical toric contact lens prescription will designate spherical correction, cylindrical optical correction and cylindrical offset.

One method for manufacturing contact lenses is cast molding. Cast molding of contact lenses involves depositing a curable mixture of polymerizable monomers in a mold cavity formed by two mold sections, curing the monomer mixture, and disassembling the mold assembly and removing the lens. One mold section forms the anterior lens surface (anterior mold section), and the other mold section forms the posterior lens surface (posterior mold section).

Prior to the cast molding of the contact lens, each of the mold sections is formed by injection molding a resin in the cavity of an injection molding apparatus. Mounted in the injection molding apparatus are tools for forming the optical surface on the mold sections. Whereas the mold sections are typically used only once for casting a lens, the injection molding tools are used to make many molds. The tools have optical quality molding surfaces so that the mold sections being made therefrom also have optical quality lens-molding surfaces.

U.S. Pat. No. 5,611,970 (Apollonio et al.) and U.S. Pat. No. 6,491,393 (Appleton et al.) provide good background of cast molding toric contact lenses. The methods disclosed in these patents are particularly useful in that the same types of anterior and posterior mold sections can be aligned at multiple rotational positions. Accordingly, the same types of anterior and posterior mold sections can be used to mold toric lenses with the same spherical and cylindrical optical corrections but with different cylindrical axis offsets, thereby reducing significantly the number of required tools. U.S. Pat. No. 5,611,970 discloses various methods of assuring the two mold sections have the desired rotational alignment with respect to one another. As one example, FIG. 2 illustrates notch 42 in the anterior mold section for engagement with its rotational support member, and detectable indicia 35 on the posterior mold section to detect the rotational position of this mold section.

The present inventors recognized, however, that prior methods sometimes do not provide sufficient control of the rotational positions between the two mold sections. Accordingly, this invention provides more robust and consistent alignment of the two mold sections employed for cast molding toric contact lenses, yet this invention may be implemented in a relatively simple and cost-effective manner.

SUMMARY OF THE INVENTION

This invention provides a contact lens mold assembly comprising a first contact lens mold section and a second contact lens mold section which are alignable at multiple rotational positions with respect to one another. The molding surface of one of the first and second mold sections is shaped to provide a molded contact lens with a stabilization feature, and the molding surface of the other of the first and second mold sections is shaped to provide a molded contact lens with an optical zone having a cylindrical optical correction. The molding surface of one of the first and second mold sections includes an anterior contact lens-molding surface, and the molding surface of the other of the first and second mold sections includes a posterior contact lens-molding surface. The first mold section includes a first set of rotational alignment features disposed angularly symmetrically on a circumference surrounding the first mold section lens-molding surface, and the second mold section includes a second set of rotational alignment features disposed angularly asymmetrically on a circumference surrounding the second mold section lens-molding surface.

This invention also provides a method of cast molding a contact lens, comprising:

providing a first contact lens mold section and a second contact lens mold section, wherein the lens-molding surface of one of the first and second mold sections is shaped to provide a molded contact lens with a stabilization feature and the lens-molding surface of the other of the first and second mold sections is shaped to provide a molded contact lens with an optical zone having a cylindrical optical correction, and wherein the lens-molding surface of one of the first and second mold sections includes an anterior contact lens-molding surface and the lens-molding surface of the other of the first and second mold sections includes a posterior contact lens-molding surface;

the first mold section including a first set of rotational alignment features thereon and disposed angularly symmetrically on a circumference surrounding the first mold section lens-molding surface, and the second mold section including a second set of rotational alignment features thereon and disposed angularly asymmetrically on a circumference surrounding the second mold section lens-molding surface, such that the first and second mold sections are alignable at multiple rotational positions;

engaging the first and second mold sections with respect to one another at a desired rotational position, such that a first rotational alignment feature in the first set contacts physically one of the rotational alignment features of the second set to prevent clockwise rotation of the first mold section, and a second, different rotational alignment feature in the first set contacts physically a different alignment feature of the second set to prevent counterclockwise rotation of the first mold section; and curing a polymerizable lens-forming mixture in a lens-shaped molding cavity formed between the anterior and posterior contact lens-molding surfaces.

According to various embodiments, for a desired rotational position of the first and second mold sections, a first rotational alignment feature in the first set contacts physically a first rotational alignment feature of the second set to prevent clockwise rotation of the first mold section, and a second, different rotational alignment feature in the first set contacts physically a second, different rotational alignment feature of the second set to prevent counterclockwise rotation of the first mold section.

For a desired rotational position of the first and second mold sections, a first rotational alignment feature in the first set may contact physically a first rotational alignment feature of the second set to prevent only clockwise rotation of the first mold section, and a second, different rotational alignment feature in the first set may contact physically a second, different rotational alignment feature of the second set to prevent only counterclockwise rotation of the first mold section.

The rotational alignment features of the first and second sets may be molded into the contact lens mold sections when the contact lens mold sections are formed by injection molding.

Each rotational alignment feature in the first set is arranged to contact more than one rotational alignment feature of the second set, depending on a desired rotational position.

According to various embodiments, the rotational positions of the first and second mold sections are evenly spaced angularly such that $\Delta i°$ represents an equal angular spacing between adjacent rotational positions, and a number (n1) of rotational alignment features in the first set and a number (n2) of rotational alignment features in the second set is defined by $$n1 \times n2 \times \Delta i° = 360°,$$

and wherein each of n1 and n2 is at least three.

The first set of rotational alignment features may be protrusions extending from an annular surface surrounding the first mold section lens-molding surface, these protrusions spaced evenly around the annular surface. The second set of rotational alignment features may also be protrusions extending from an annular surface surrounding the second mold section lens-molding surface, these protrusions spaced unevenly around the annular surface.

DETAILED DESCRIPTION OF THE PREFERRED EMBODIMENTS

Figure 1:
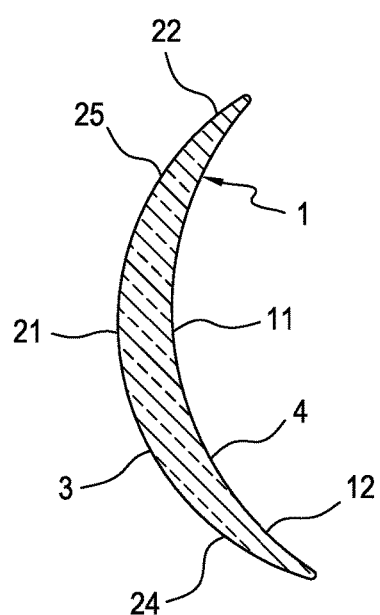
FIG. 1 is a schematic cross-sectional view of a representative toric contact lens.

FIG. 1 schematically illustrates a representative toric contact lens 1. The central zone 11 of posterior surface 4 is toric. That is, this zone has a toric surface that provides the desired cylindrical optical correction. The posterior surface 4 may optionally include at least one peripheral curve 12 surrounding the central toric zone 11. For the described embodiment, the central zone 21 of anterior surface 3 is spherical, and the spherical curve is matched with central zone 11 to provide the desired spherical correction to the lens. The anterior surface 3 may optionally include at least one peripheral curve 22 surrounding the central zone 21. This invention is applicable, however, to toric contact lenses having the toric surface on the anterior surface.

The lens 1 is provided with a stabilization feature so that the lens maintains a desired rotational orientation on the eye. As one example, schematically shown in FIG. 1, section 24 (which represents the lower section when the lens is properly oriented on a wearer's eye) has a different thickness profile than section 25. Thus, the anterior surface 3 of the toric contact lens of FIG. 1 is prism ballasted, but toric contact lenses with other types of on-eye stabilization features may be employed in this invention, including peri-ballasting or slab-off. Generally, the stabilization feature will be symmetrical about the vertical meridian when the lens is properly oriented on the eye, and the axis of the stabilization feature will correspond to this vertical meridian.

Central zone 11 has the cylindrical correction to correct the wearer's astigmatism. As discussed above, toric contact lens prescriptions define the offset between the axis of the stabilization feature and the cylindrical axis of the toric zone by a selected rotational angle. This is because the toric zone not only needs to match the wearer's cylindrical correction, but also needs to align with the cylindrical axis of the wearer's eye. As an example, toric contact lenses are currently offered in increments of 10 degrees, ranging from 10 degrees to 180 degrees, where 90 degrees corresponds to the cylindrical axis falling on the vertical meridian and 180 degrees corresponds to the cylindrical axis falling on the horizontal meridian. Toric contact lenses may be offered in other increments, such as 5, 15 or 20 degree increments, and this invention is applicable to such incremental offsets.

Figure 2:
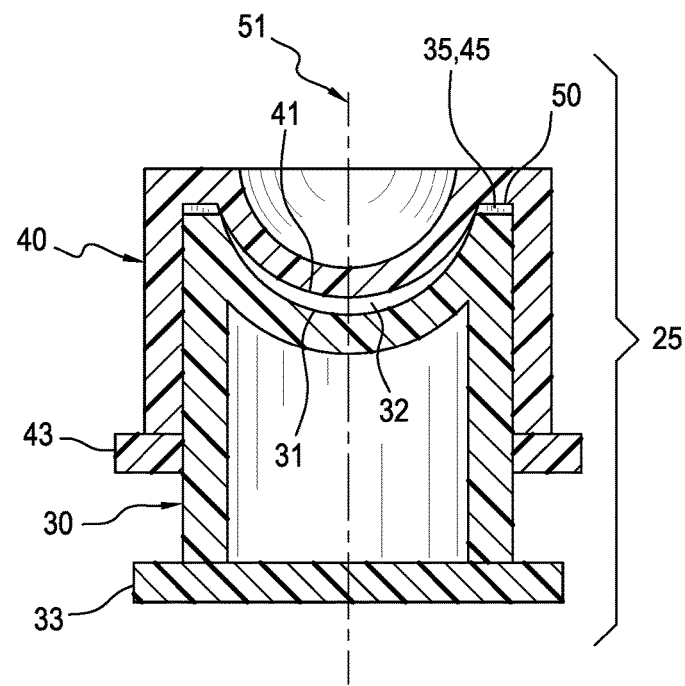
FIG. 2 is a schematic cross-section view of a representative mold assembly for cast molding a toric contact lens according to various embodiments of the invention.
Figure 3:
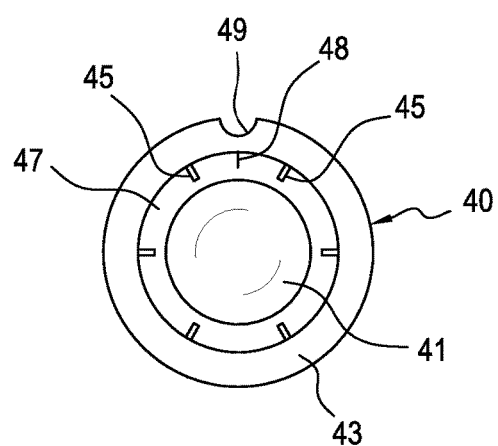
FIG. 3 is a bottom plan view of the posterior mold in FIG. 2.
Figure 4:
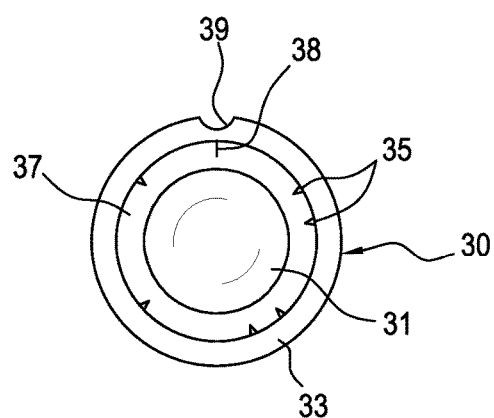
FIG. 4 is a top plan view of the anterior mold in FIG. 2.

A representative mold assembly 25 for cast molding toric contact lenses according to this invention is illustrated in FIGS. 2 to 4. The mold assembly includes first and second mold sections 40, 30. In the Figures, the second mold section is the anterior mold section 30, and the first mold section is the posterior mold section 40. Anterior mold section 30 includes an optical quality anterior lens-molding surfaces 31 for forming the contact lens anterior surface 3, and posterior mold section 40 includes an optical quality posterior lens-molding surface 41 for forming the contact lens posterior surface 4. When the mold sections are fully assembled, a lens-forming cavity 32 is defined between lens-molding surfaces 31, 41. Typically, each of the mold sections is injection molded from a plastic resin in an injection molding apparatus, according to methods generally known in the art. In the illustrated embodiment, the mold sections include flanges 33, 43, but these flanges are optional, and this invention is applicable for other configurations of first and second mold sections.

As in the method described in U.S. Pat. No. 5,611,970 and U.S. Pat. No. 6,491,393, referenced above, mold sections 30, 40 are rotatable with respect to one another, about axis 51, so that the same types of mold assemblies (i.e., mold assemblies providing the same spherical and cylindrical corrections) may be employed to cast mold toric contact lenses having the same spherical and cylindrical corrections but different rotational offsets with respect to the cylindrical axis. However, this invention provides more robust and consistent alignment of the two mold sections employed for cast molding toric contact lenses, and may be implemented in a relatively simple and cost-effective manner.

An illustrative embodiment for ensuring the desired rotational positions of the mold sections with respect to one another will be described with reference to FIGS. 3 and 4. In this illustrated embodiment, the rotational positions of the mold sections are evenly spaced angularly in increments of 10 degrees ($\Delta i°$).

Posterior mold section 40 includes a first set of rotational alignment features 45 disposed on a circumference surrounding lens-molding surface 41. In the illustrated embodiment, rotational alignment features 45 are protrusions, extending from planar annular surface 47 surrounding lens-forming surface 41. Anterior mold section 30 includes a complementary, second set of rotational alignment features 35 disposed on a circumference surrounding lens-molding surface 31. In the illustrated embodiment, rotational alignment features 35 are protrusions, extending from planar annular surface 37 surrounding lens-forming surface 31.

The rotational alignment features 45 are disposed angularly symmetrically on annulus 47. In other words, for the illustrated embodiment with six rotational alignment features 45, each pair of adjacent rotational alignment features 45 is separated by 60 degrees. As another example, if four rotational alignment features were employed, they would be separated by 90 degree angles.

The rotational features 35 are disposed angularly asymmetrically on annulus 37. In the illustrated embodiment, the six rotational alignment features are disposed at the following angular spacings between adjacent rotational alignment features: 30 degrees, 50 degrees, 20 degrees, 70 degrees, 80 degrees and 110 degrees.

Rotational alignment features 35, 45 each have sufficient height that they will physically contact each other, as schematically shown in FIG. 2. However, the height of either feature 35 or 45 should not be too high such that the features would prohibit the mold sections from being assembled, i.e., neither has a height exceeding the height of spacing 50 for the illustrated embodiment. The protrusions forming the rotational alignment features may be molded into their respective contact lens mold section; for example, when the mold section is injection molded from tooling, the tooling has been chemically or laser etched to provide such protrusions.

Optionally, the mold sections may be provided with notch 39 or 49, or another physical feature, to assist with orienting the mold sections. Optionally, the mold sections may be provided with an indicia 38 or 48, for detection by a machine vision system, for example, to assist with detecting orientation of a mold section. Such features are optional, and this invention can be adapted to various toric cast molding systems, employing various mold configurations.

FIGS. 5 to 8 illustrate interaction of the two sets of mold alignment features for the embodiment of FIGS. 3 to 4, so as to align the mold sections in a desired rotational position, and thereby provide a contact lens molded therein with the desired angular offset of the cylindrical axis and vertical meridian. In each of FIGS. 5 to 8, the same type of mold sections 30 and 40 are employed to achieve the desired angular offset in increments of 10 degrees, the mold assemblies provide the same spherical and cylindrical corrections but are rotatable to provide different angular offsets.

Figure 5:
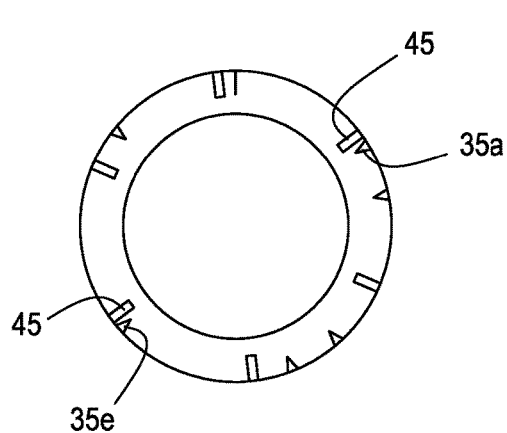
FIGS. 5 to 8 schematically illustrates interaction of two sets of rotational alignment features.

In FIG. 5, alignment feature 35a contacts a first alignment feature 45, thereby preventing mold section 40 from rotating clockwise. Alignment feature 35e contacts a second, different alignment feature 45, thereby preventing mold section 40 from rotating counterclockwise. The other rotational alignment features in the first and second sets are still included on the mold sections but are not used. In fact, alignment feature 35a only prevents mold section 40 from rotating clockwise, and alignment feature 35e only prevents mold section 40 from rotating counterclockwise.

Figure 6:
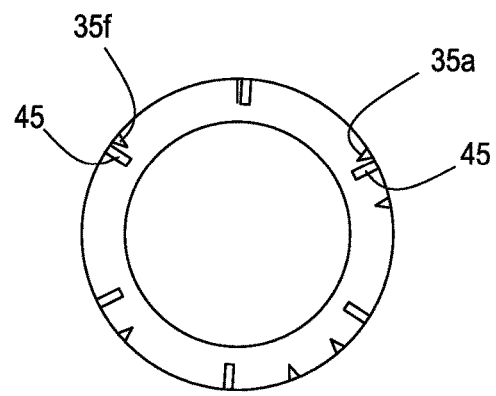

FIG. 6 represents an angular offset varying from FIG. 5 by 10 degrees. In FIG. 6, alignment feature 35f contacts an alignment feature 45, thereby preventing mold section 40 from rotating clockwise. Alignment feature 35a contacts a different alignment feature 45, thereby preventing mold section 40 from rotating counterclockwise. The other rotational alignment features in the first and second sets are still included on the mold sections but are not used.

Figure 7:
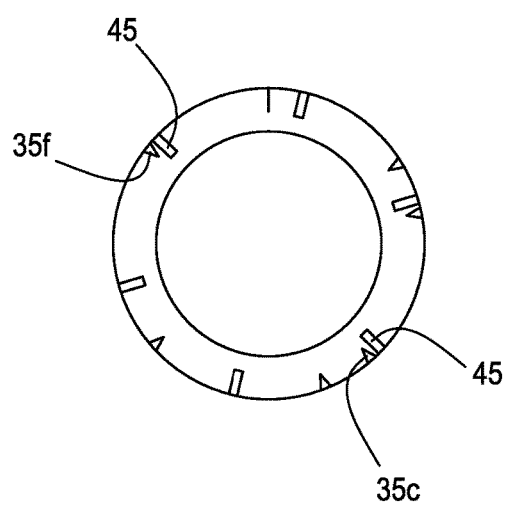

FIG. 7 represents an angular offset varying from FIG. 6 by 10 degrees. In FIG. 7, alignment feature 35c contacts an alignment feature 45, thereby preventing mold section 40 from rotating clockwise. Alignment feature 35f contacts a different alignment feature 45, thereby preventing mold section 40 from rotating counterclockwise. The other rotational alignment features in the first and second sets are still included on the mold sections but are not used.

Figure 8:
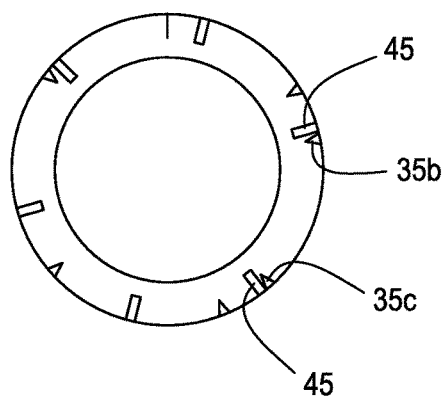

FIG. 8 represents an angular offset varying from FIG. 7 by 10 degrees. In FIG. 8, alignment feature 35b contacts an alignment feature 45, thereby preventing mold section 40 from rotating clockwise. Alignment feature 35c contacts a different alignment feature 45, thereby preventing mold section 40 from rotating counterclockwise. The other rotational alignment features in the first and second sets are still included on the mold sections but are not used.

The mold sections 30, 40 of FIGS. 3 and 4 can be used to orient the molds at each additional 10 degree interval ranging from 10 degrees to 180 degrees. It will be appreciated that each rotational alignment feature 45 in the first set is arranged to contact more than one rotational alignment feature in the second set, depending on the specific desired rotational positions of the mold sections.

It is not necessary that the first and second sets of rotational alignment features each include six alignment figures each. Additionally, this invention is applicable for increments of rotational positions other than 10 degrees. Generally, other "matrices" of first and second sets of rotational alignment features may be developed according to the following:

$$n1 \times n2 \times \Delta i° = 360°$$

wherein $\Delta i°$ represents an equal angular spacing between adjacent rotational positions, integer n1 represents the number of rotational alignment features in the first set, and integer n2 represents the number of rotational alignment features in the second set. Thus, in the illustrated embodiment, n1 and n2 both equal six, and $\Delta i°$ equals 10 degrees. In practice, n1 and n are preferably both at least three, so that there is sufficient space between rotational alignment features—this not only avoids complicating the injection molding process by having many features closely grouped together, but also avoids the potential for erroneously employing the wrong alignment features because there is insufficient spacing therebetween.

It will be appreciated this invention requires fewer alignment features on the molds than other approaches for cast molding toric contact lenses. As an example, in order to obtain the range of 10 to 180 degrees in ten-degree increments, as few as twelve features (six protrusions on each mold section) may be used for the present method. In contrast, an alternative approach would be to employ a single pin (or key) on one mold section, and eighteen complementary notches (or slots) on the other mold section, thus requiring at least nineteen features. Stated differently, in the present method, one may employ less total alignment features than such an alternative approach by having each of n1 and n2 be at least three.

This invention may be adapted relatively simply and cost effectively to existing automated or semi-automated cast molding operations for toric contact lenses. As an example for implementing the method, the manufacturing floor control module may include a database with the matrix of the various rotational positions of the contact lens mold sections. In molding a lot of contact lenses with a specific prescription, this database is referenced to provide the mold sections at the proper orientation with respect to one another. Physical features such as notches 39, 49, and/or machine readable indicia such as 38, 48, may be employed by the system to determine an initial orientation of the mold sections, as well as confirm the desired final orientation is achieved, at which point the mold sections are then engaged with the rotational alignment features maintaining the desired rotational alignment of the mold sections with respect to one another.

Once the mold sections are assembled in their final, desired position, a polymerizable lens-forming monomer mixture may be cured in the lens-shaped molding cavity 32 formed between the anterior and posterior contact lens-molding surfaces, such as by exposure to UV light or heat. Other conventional post-molding operations may be employed, including disassembling the cast molding assembly and removing the molded lens therefrom, lens inspection, hydration in the case of hydrogel contact lenses, and lens packaging.

Additionally, this invention provides robust and consistent rotational alignment of the two mold sections. In cast molding systems that clamp the mold parts, there is a risk that the clamping operation may rotate slightly one of the mold sections out of position. In cast molding systems where one mold section essentially "floats" on the other mold section, vibration or operator error may shift the positions of the mold sections. This invention helps to avoid such risks of misalignment of toric mold sections. In other words, once the mold sections are oriented in the desired rotational position with respect to one another, the rotational alignment features essentially maintain or "lock" the assembled mold sections at this desired rotational position.

It will be appreciated that these improvements in rotational alignment solves problems found in various existing toric cast molding systems. For example, since the two mold sections are robustly aligned rotationally, the resultant molded contact lens is assured to have its cylindrical axis more precisely aligned with its stabilization feature, thereby providing improved vision to the wearer. Further, all toric contact lens of a given prescription are consistent, and therefore, a practitioner may prescribe a toric lens with confidence that delivered lenses will correspond to the trial lens used for initial fitting.

Accordingly, this invention provides robust and consistent rotational alignment of the two mold sections and also may be employed in the general toric cast molding methods described in U.S. Pat. No. 5,611,970 and U.S. Pat. No. 6,491,393, referenced above, where the same types of mold assemblies (i.e., mold assemblies providing the same spherical and cylindrical corrections) may be employed to cast mold toric contact lenses having the same spherical and cylindrical corrections but different rotational offsets with respect to the cylindrical axis.

As mentioned, this invention is applicable to contact lens mold configurations, toric contact lens designs, and sets of rotational alignment features other than those illustrated in the figures. As an example, the rotational alignment features may be arranged on other portions of the contact lens molds, as long as they are arranged circumferentially and are not placed on the lens-molding surfaces. Given the present description, a person of ordinary skill in the art will readily understand any adaptations to the illustrated embodiment to accommodate different toric contact lens cast mold systems and toric lens designs.

Therefore, it will be understood that various modifications may be made to the embodiments disclosed herein. Therefore the above description should not be construed as limiting, but merely as exemplifications of preferred embodiments. Other arrangements and methods may be implemented by those skilled in the art without departing from the scope and spirit of this invention. Moreover, those skilled in the art will envision other modifications within the scope and spirit of the claims appended hereto.

What is claimed is:

1. A contact lens mold assembly comprising:
 (a) a first contact lens mold section and a second contact lens mold section which are alignable at multiple rotational positions with respect to one another and each of which includes a molding surface;
 (b) the molding surface of one of the first and second mold sections shaped to provide a molded contact lens with a stabilization feature, and the molding surface of the other of the first and second mold sections shaped to provide a molded contact lens with an optical zone having a cylindrical optical correction;
 (c) the molding surface of one of the first and second mold sections including an anterior contact lens-molding surface, and the molding surface of the other of the first and second mold sections including a posterior contact lens-molding surface;
 (d) the first mold section includes a first set of rotational alignment features disposed angularly symmetrically on a circumference surrounding the first mold section lens-molding surface, and the second mold section includes a second set of rotational alignment features disposed angularly asymmetrically on a circumference surrounding the second mold section lens-molding surface.

2. The mold assembly of claim 1, wherein for a specific rotational position of the first and second mold sections, a first rotational alignment feature in the first set contacts physically a first rotational alignment feature of the second set to prevent clockwise rotation of the first mold section, and a second, different rotational alignment feature in the first set contacts physically a second, different rotational alignment feature of the second set to prevent counterclockwise rotation of the first mold section.

3. The mold assembly of claim 1, wherein for a specific rotational position of the first and second mold sections, a first rotational alignment feature in the first set contacts physically a first rotational alignment feature of the second set to prevent only clockwise rotation of the first mold section, and a second, different rotational alignment feature in the first set contacts physically a second, different rotational alignment feature of the second set to prevent only counterclockwise rotation of the first mold section.

4. The mold assembly of claim 1, wherein the rotational alignment features of the first and second sets are molded into the contact lens mold sections when the contact lens mold sections are formed by injection molding.

5. The mold assembly of claim 1, wherein each rotational alignment feature in the first set is arranged to contact more than one rotational alignment feature of the second set, depending on a specific rotational position.

6. The mold assembly of claim 1, wherein the rotational positions of the first and second mold sections are evenly spaced angularly such that $\Delta i°$ represents an equal angular spacing between adjacent rotational positions, and a number (n1) of rotational alignment features in the first set and a number (n2) of rotational alignment features in the second set is defined by $n1 \times n2 \times \Delta i° = 360°$, and wherein each of n1 and n2 is at least three.

7. The mold assembly of claim 6, wherein $\Delta i°$ represents 10°, and $n1 \times n2 = 36$.

8. The mold assembly of claim 7, where n1 and n2 each is six.

9. The mold assembly of claim 1, wherein the first set of rotational alignment features are protrusions extending from an annular surface surrounding the first mold section lens-molding surface, said protrusions spaced evenly around the annular surface.

10. The mold assembly of claim 9, wherein the second set of rotational alignment features are protrusions extending from an annular surface surrounding the second mold section lens-molding surface, said protrusions spaced unevenly around the annular surface.

11. A method of cast molding a contact lens, comprising:
(a) providing a first contact lens mold section and a second contact lens mold section, wherein a lens-molding surface of one of the first and second mold sections is shaped to provide a molded contact lens with a stabilization feature and a lens-molding surface of the other of the first and second mold sections is shaped to provide a molded contact lens with an optical zone having a cylindrical optical correction, and wherein the lens-molding surface of one of the first and second mold sections includes an anterior contact lens-molding surface and the lens-molding surface of the other of the first and second mold sections includes a posterior contact lens-molding surface;
(b) the first mold section including a first set of rotational alignment features thereon and disposed angularly symmetrically on a circumference surrounding the first mold section lens-molding surface, and the second mold section including a second set of rotational alignment features thereon and disposed angularly asymmetrically on a circumference surrounding the second mold section lens-molding surface, such that the first and second mold sections are alignable at multiple rotational positions;
(c) engaging the first and second mold sections with respect to one another at a specific rotational position, such that a first rotational alignment feature in the first set contacts physically one of the rotational alignment features of the second set to prevent clockwise rotation of the first mold section, and a second, different rotational alignment feature in the first set contacts physically a different alignment feature of the second set to prevent counterclockwise rotation of the first mold section; and
(d) curing a polymerizable lens-forming mixture in a lens-shaped molding cavity formed between the anterior and posterior contact lens-molding surfaces.

12. The method of claim 11, wherein contact between said first rotational alignment feature in the first set and said one of the rotational alignment features of the second set prevents only clockwise rotation of the first mold section, and contact between said second rotational alignment feature in the first set and said second, different rotational alignment feature of the second set prevents only counterclockwise rotation of the first mold section.

13. The method of claim 11, wherein the rotational alignment features of the first and second sets are molded into the contact lens mold sections when the contact lens mold sections are formed by injection molding.

14. The method of claim 11, wherein each rotational alignment feature in the first set is arranged to contact more than one rotational alignment feature of the second set, depending on a specific rotational position.

15. The method of claim 11, wherein specific rotational positions of the first and second mold sections are evenly spaced angularly such that $\Delta i°$ represents an equal angular spacing between adjacent rotational positions, and a number (n1) of rotational alignment features in the first set and a number (n2) of rotational alignment features in the second set is defined by $n1 \times n2 \times \Delta i° = 360°$, and wherein each of n1 and n2 is at least three.

16. The method of claim 15, wherein $\Delta i°$ represents 10°, and $n1 \times n2 = 36$.

17. The method of claim 11, wherein the first set of rotational alignment features are protrusions extending from an annular surface surrounding the first mold section lens-molding surface, said protrusions spaced evenly around the annular surface.

18. The method of claim 11, wherein the second set of rotational alignment features are protrusions extending from an annular surface surrounding the second mold section lens-molding surface, said protrusions spaced unevenly around the annular surface.

* * * * *